United States Patent [19]

Haas et al.

[11] 4,391,783
[45] Jul. 5, 1983

[54] PROCESS FOR MAKING ABRASION-RESISTANT SODIUM TRIPOLYPHOSPHATE

[75] Inventors: Hans Haas, Swisttal-Strassfeld; Werner Kowalski, Weilerswist-Metternich, both of Fed. Rep. of Germany

[73] Assignee: Hoechst Aktiengesellschaft, Fed. Rep. of Germany

[21] Appl. No.: 356,023

[22] Filed: Mar. 8, 1982

[30] Foreign Application Priority Data

Mar. 13, 1981 [DE] Fed. Rep. of Germany ....... 3109652

[51] Int. Cl.$^3$ ..................... C01B 15/16; C01B 25/26
[52] U.S. Cl. ................................... 423/315; 423/305
[58] Field of Search ............... 423/305, 306, 312, 315; 252/135

[56] References Cited

U.S. PATENT DOCUMENTS 3,761,573  9/1973  Hinz et al. ........................ 423/315
3,770,644  11/1973  Huttinger et al. ................. 423/315

FOREIGN PATENT DOCUMENTS 1002742  2/1957  Fed. Rep. of Germany .
1007748  5/1957  Fed. Rep. of Germany .
1097421  1/1961  Fed. Rep. of Germany .
1120626  12/1961  Fed. Rep. of Germany .
2008495  5/1974  Fed. Rep. of Germany .
2515141  12/1979  Fed. Rep. of Germany .

Primary Examiner—O. R. Vertiz
Assistant Examiner—Gregory A. Heller
Attorney, Agent, or Firm—Connolly and Hutz

[57] ABSTRACT

The disclosure relates to a process for making granular sodium tripolyphosphate of high abrasion resistance. To this end, the disclosure provides for sodium orthophosphate to be subjected to a one-stage spray-drying operation inside a heated spray tower by means of a nozzle with condensation of the orthophosphate. More particularly the orthophosphate is sprayed jointly with a solution of a high molecular weight phosphate of sodium, potassium or ammonium.

8 Claims, No Drawings

PROCESS FOR MAKING ABRASION-RESISTANT SODIUM TRIPOLYPHOSPHATE

The present invention relates to a process for making granular, highly abrasion-resistant sodium triphosphate (which is also termed sodium tripolyphosphate or briefly STPP).

Granular abrasion-resistant STPP is to an increasing extent being used for the manufacture of detergent compositions and dish washing agents. The reason for this resides in the fact that it can be dry-blended with the other constituents of those compositions or agents, whereas it has been normal heretofore for detergent compositions and dish washing agents to be produced by spray-drying an aqueous slurry.

In view of the attempts which are being made to effect an economy of energy and to inhibit hydrolysis of STPP in the slurry, the dry-blending of the various components making the final product is to an increasing extent gaining commercial interest.

STPP which is suitable for the uses just described, is, however, required to meet certain specifications. More specifically, it is necessary for it:

(1) to be abrasion-resistant as far as possible;
(2) to be available as granular material free or substantially free from dust particles; and
(3) to be available as material with an apparent density within the wide limits of about 350 to 900 g/l.

Heretofore, abrasion resistant granular STPP has customarily been produced by subjecting feed STPP made by whatever process to granulation. As regards this feed STPP, it has been necessary for it to be finely ground in a series of processing steps and separated into a plurality of sieved fractions, for these fractions to be placed in a rotating plate, in a drum or rotating tube and to be granulated thereon or therein by treatment with water or an aqueous phosphate solution, and often for the granulate to be dried, calcined and sieved once again.

While these granulates can be said to be abrasion-resistant, the fact remains that they always have a medium high or high apparent density within the range 550 g/l to 1000 g/l, as a result of the high density of the compact granulate (DE-PS No. 20 08 495; DE-PS No. 25 15 141).

No granulate of low apparent density has however been made heretofore in the manner described above. A technically highly beneficial process for making STPP from sodium orthophosphates comprises subjecting a sodium orthophosphate solution or suspension to a one-stage spray-drying operation.

This is a process wherein the material is commonly obtained in the form of so-called beads, i.e. in the form of small hollow and very thin-walled balls (DE-PS No. 10 97 421; DE-AS No. 11 20 626) with just a minor amount of abrasion-resistance.

In order to reduce the apparent density of the sprayed products, the orthophosphate solution or suspension is often admixed with gas-yielding addends, prior to being sprayed. As a result, the hollow balls become even more inflated, more thin-walled and even less abrasion-resistant.

The addends are selected, for example, from urea or low valent phosphorus compounds (DE-PS No. 10 02 742).

The facts just referred to have resulted in tests to harden STPP-beads obtained by spray-drying.

U.S. Pat. No. 3,661,514, for example, describes a process wherein, inside a spray tower, an alkali metal orthophosphate solution is sprayed from below against a hot gas stream travelling downwardly therein and being generated by gas burners disposed near the head of the tower. Solid particles which are being formed in the upper portion of the tower are dropping through the orthophosphate solution flowing upwardly in the tower, become thereby coated with a thin layer of orthophosphate which, however, ceases to be condensed in the lower, colder portion of the tower.

Indeed, the resulting product is more abrasion-resistant than beads made in customary fashion, but contains considerably less $Na_5P_3O_{10}$ due to incomplete condensation of the orthophosphate, which is not desirable.

The present invention now unexpectedly provides a process which permits the adverse effects described above to be avoided and comprises: subjecting a sodium orthophosphate solution or suspension containing $Na_2O$ and $P_2O_5$ in the molar ratio desired for the sodium triphosphate to a one-stage spray-drying operation inside a heated spray tower by means of a nozzle with condensation of the orthophosphate, the orthophosphate being sprayed jointly with a solution of a high molecular weight phosphate of sodium, potassium or ammonium containing between 60 and 73 weight % of $P_2O_5$. A preferred feature provides for the solution of the high molecular weight phosphate, which should preferably contain 5 and more preferably more than 10 P-atoms in its molecule, e.g. Graham salt, to be mixed in the nozzle with the sodium orthophosphate solution or suspension just directly prior to spraying, and preferably in such a manner that prior to being sprayed the various components remain in contact with each other over a period of less than 0.4 second. It is also preferable for the solution of the high molecular weight phosphate to contain the dissolved phosphate in a proportion of 0.5 to 25 weight %, and for it to be used in a proportion of 0.005 to 5 weight %, preferably 0.01 to 0.1 weight %, based on the $P_2O_5$-content of the sodium orthophosphate solution and calculated as solid matter.

If necessary, the resulting practically anhydrous sprayed product can be hydrated in known manner by treatment with a suitable quantity of water or steam until up to 22.7 weight % of water of crystallization is contained therein. In other words, the invention provides for the manufacture of anydrous, partially or completely hydrated products.

In addition to this, it is readily possible by the selection of suitable spray conditions, especially by modifying the temperature of the gases issuing from the tower to make spray products containing 5 up to 99 weight % of the high temperature modification of STPP (cf. DE-PS No. 10 07 748).

The spray products made in accordance with this invention normally have an apparent density of 600 to 900 g/l. As already stated hereinabove, the one-stage spray processes for making STPP provide for the apparent density of the spray products to be reduced by admixing the orthophosphate which is to be sprayed with inflating agents, e.g. urea or low valent phosphate compounds. Spraying such materials in the manner described herein results in the formation of products with an apparent density reduced down to 350 g/l. This is light material which is as abrasion-resistant as the products of higher apparent density made in accordance with this invention.

The products have an abrasion resistance which is up to 10 times higher than that of STPP made by conventional spray methods. Already inside the spray tower is the material sifted by the off-gas stream. Dusty material escapes from the tower together with the off-gas and is separated therefrom in centrifugal separators. Granular product accumulates in the lower portion of the tower. By making use of the sifting effect produced inside the tower, it is unnecessary for the product to be screened in technically expensive manner.

In other words, the invention provides a simple process for making STPP which not only fully complies with the three specifications defined in the opening paragraphs, but can also be varied within wide limits as to its content of high and low temperature modifications, respectively, and its content of water of crystallization. The spraying operation should preferably be effected with the use of a two-opening nozzle which is fed with high pressure steam or compressed air as the propellant and which is designed to comprise a fluidization zone in which the orthophosphate solution or suspension and the solution of the high molecular weight phosphate become intensively mixed and are successively caused to issue jointly therefrom under pressure through the nozzle.

The spray tower itself is operated equicurrently, i.e. the solution which is to be sprayed and hot gas stream travel down-wardly in the tower. The spray nozzle has a set of burners for burning the fuel gas, e.g. carbon monoxide or natural gas, disposed around it. On being passed through the flame zone, the droplets issuing from the spray nozzle become spontaneously dehydrated and orthophosphate contained in them is directly condensed to triphosphate.

EXAMPLE 1

(Comparative Example)

23 m$^3$ orthophosphate slurry containing 31 weight % P$_2$O$_5$ was prepared in a container. The Na : P-ratio in the slurry was 5 : 3. The slurry was sprayed at a rate of 10 m$^3$/h in a spray tower at an off-gas temperature of 345° C. 8.7 metric tons tripolyphosphate which contained 97.4 weight % Na$_5$P$_3$O$_{10}$ and less than 0.2 weight % higher condensed phosphates was obtained per hour. The product contained 8.5 weight % high temperature modification. 2.7 metric tons practically anhydrous product was separated in dust form in 6 cyclones from the off-gas, separately cooled and stored. 6.0 metric tons product was found to have accumulated in the base portion of the tower, from which it was delivered to a cooler and ultimately to a bunker.

This granular tower product was tested as to its abrasion resistance. To this end, product was sieved in the laboratory. 50 g of the product fraction retained on a sieve with meshes 0.1 mm wide was introduced into a small rotating drum. Placed therein were 8 aluminum balls of which each weighed 10 g. The material was treated in this ball mill exactly for 10 minutes. Next, it was sieved off and the material retained on the sieve with meshes 0.1 mm wide was weighed again. In the present Example 2.7 g product was retained on the sieve.

The abrasion resistance of the tripolyphosphate accordingly was 5.4%.

EXAMPLE 2

23 m$^3$ orthophosphate slurry the same as that in Example 1 was prepared as described in that Example.

5 m$^3$ of an 8 weight % aqueous solution of high molecular weight Na-melt phosphate (Graham salt) which contained 70% P$_2$O$_5$ was prepared in a second vessel. By means of a pump, the solution was fed at a rate of 600 l/h to the spray nozzle provided in the spray tower. In the fluidization chambers of the nozzle, the solution became admixed with the orthophosphate slurry which was sprayed at a rate of 10 m$^3$ at an off-gas temperature of 345° C.

Practically anhydrous tripolyphosphate which was removed from the tower contained 98.3 weight % Na$_5$P$_3$O$_{10}$ and less than 0.2% higher condensed phosphates. 9.1 weight % of the material was high temperature modification (phase I).

As in Example 1, the product removed through the base portion of the tower was tested for its abrasion resistance, which was 57 weight %; the apparent density was 750 g/l.

EXAMPLE 3

(Comparative Example)

23 m$^3$ orthophosphate slurry containing 31 weight % P$_2$O$_5$ was prepared as described in Example 1; the slurry was admixed with 80 kg phosphorous acid and a Na : P-ratio of 5 : 3 was established.

9 m$^3$/h slurry was sprayed in a spray tower at an off-gas temperature of 410° C. 7.8 metric tons tripolyphosphate was obtained of which 5.9 metric tons were retained as granular product in the tower. The product contained 51 weight % phase-I material; 97.3 weight % was Na$_5$P$_3$O$_{10}$; it contained 0.2 weight % higher condensed phosphates and had an apparent density of 440 g/l The abrasion resistance was 5.0 weight %.

EXAMPLE 4

23 m$^3$ orthophosphate slurry containing 31 weight % P$_2$O$_5$ was prepared as described in Example 3. The slurry was admixed with 80 kg phosphorous acid and a Na:P-ratio of 5 : 3 was established.

5 m$^3$ of a 3 weight % solution of ammonium polyphosphate was prepared in a second vessel.

By means of a pump, the solution was delivered at a rate of 600 l/h to the spray nozzle provided in the spray tower. In the fluidization chambers of the nozzle, the ammonium polyphosphate solution became mixed with the orthophosphate slurry which was sprayed at a rate of 9 m$^3$/h at an off-gas temperature of 410° C., as described in Example 3.

5.9 metric tons granular product obtained in the tower contained 60 weight % phase-I material, had an abrasion resistance of 61 weight %, an apparent density of 445 g/l, contained 98.1 weight % Na$_5$P$_3$O$_{10}$, and less than 0.2 weight % higher condensed phosphates.

EXAMPLE 5

Practically anhydrous tripolyphosphate with an abrasion resistance of 61 weight %, prepared as described in Example 4, was introduced into a rotating tube provided with accessory equipment and treated therein with steam for as long as necessary to obtain a final product containing 2.9 weight % water. The product was treated for its abrasion resistance which was 62% Its apparent density was 515 g/l.

EXAMPLE 6

Tripolyphosphate with an abrasion resistance of 61 weight %, prepared as described in Example 4, was placed in a rotating tube provided with accessory equipment and treated therein with steam and water for as long as necessary to obtain a final product containing 18.3 weight % water. The abrasion resistance was 62 weight % and the apparent density 520 g/l.

We claim:

1. A process for making granular sodium tripolyphosphate of high abrasion resistance which comprises: spray-drying a sodium orthophosphate solution or suspension containing $Na_2O$ and $P_2O_5$ in essentially the molar ratio required for the sodium tripolyphosphate in a one-stage spray-drying operation by means of a nozzle inside a heated spray tower with the resultant formation of the tripolyphosphate, the orthophosphate solution or suspension being sprayed jointly with a solution of a high molecular weight phosphate of sodium, potassium or ammonium containing between 60 and 73 weight % $P_2O_5$, the proportion of the said solution being 0.005 to 5 weight %, calculated as solid substance and based on the $P_2O_5$-content of the orthophosphate solution or suspension.

2. The process as claimed in claim 1, wherein the solution of the high molecular weight phosphate is mixed inside the nozzle with the sodium orthophosphate solution or suspension just prior to spraying.

3. The process as claimed in claim 2, wherein the solution of the high molecular weight phosphate is mixed with the sodium orthophosphate solution or suspension in such a manner that prior to being sprayed the components remain in contact with each other over a period of less than 0.4 second.

4. The process as claimed in claim 1, wherein the solution of the high molecular weight phosphate contains 0.5 to 25 weight % of dissolved high molecular weight phosphate.

5. The process as claimed in claim 1, wherein the high molecular weight phosphate is used in a proportion of 0.01 to 0.1 weight %.

6. The process as claimed in claim 1, wherein the product is hydrated by treating it with a suitable quantity of water or steam so as to establish a 22.7 weight % content of water of crystallization therein.

7. A process for making abrasion-resistant, granular, substantially anhydrous sodium tripolyphosphate which consists essentially of:

mixing a sodium orthophosphate solution or suspension containing $Na_2O$ and $P_2O_5$ in essentially the molar ratio required for the sodium tripolyphosphate with a solution of a high molecular weight phosphate of sodium, potassium or ammonium containing between 60 and 73 weight % $P_2O_5$, the proportion of the said solution being 0.005 to 5 weight %, calculated as solid substance and based on the $P_2O_5$-content of the orthophosphate solution or suspension;

spray-drying the resulting mixture in a one-stage spray-drying operation by means of a nozzle inside a heated spray tower;

recovering from the spray tower the abrasion-resistant, granular, substantially anhydrous sodium tripolyphosphate which results from the one-stage spray-drying operation.

8. A process according to claim 7 wherein the abrasion-resistant, granular, substantially anhydrous sodium tripolyphosphate product recovered from the spray tower is hydrated with water or steam to introduce water of crystallization into said product.

* * * * *